United States Patent
Coons et al.

(10) Patent No.: US 10,066,427 B2
(45) Date of Patent: Sep. 4, 2018

(54) SIMPLIFIED DRAW LATCH WITH BENT WIREFORM MID-LINKAGE

(71) Applicant: GoPro, Inc., San Mateo, CA (US)

(72) Inventors: Evan L. Coons, San Mateo, CA (US); Joshua P. Davies, Fremont, CA (US); Todd Lewis, Corvallis, OR (US)

(73) Assignee: GoPro, Inc., San Mateo, CA (US)

( * ) Notice: Subject to any disclaimer, the term of this patent is extended or adjusted under 35 U.S.C. 154(b) by 187 days.

(21) Appl. No.: 14/313,786

(22) Filed: Jun. 24, 2014

(65) Prior Publication Data

US 2015/0022717 A1  Jan. 22, 2015

Related U.S. Application Data

(60) Provisional application No. 61/856,606, filed on Jul. 19, 2013.

(51) Int. Cl.
 *E05C 19/12* (2006.01)
 *E05C 19/14* (2006.01)
 (Continued)

(52) U.S. Cl.
 CPC .............. *E05C 19/14* (2013.01); *B65D 45/24* (2013.01); *G03B 17/08* (2013.01); *H04N 5/2252* (2013.01);
 (Continued)

(58) Field of Classification Search
 CPC ........... Y10T 292/216; Y10T 292/0911; Y10T 292/0913; Y10T 292/0917; Y10T 292/0918; Y10T 292/0926; Y10T 292/0932; Y10T 292/0934; Y10T 292/0949; Y10T 292/0951; Y10T 292/0952; Y10T 292/0954; Y10T 292/0956; Y10T 292/0959;
 (Continued)

(56) References Cited

U.S. PATENT DOCUMENTS

| | | | | |
|---|---|---|---|---|
| 913,214 A | * | 2/1909 | Kivlan | B65D 45/24 |
| | | | | 215/280 |
| 1,383,215 A | * | 6/1921 | Kivlan | B65D 45/24 |
| | | | | 215/287 |

(Continued)

FOREIGN PATENT DOCUMENTS

| | | | | |
|---|---|---|---|---|
| CH | 261245 A | * | 4/1949 | ............. E05C 19/14 |
| DE | 971191 C | * | 12/1958 | ............. E05C 19/14 |

(Continued)

OTHER PUBLICATIONS

International Search Report and Written Opinion for International Application No. PCT/US2014/044113, dated Nov. 4, 2014, 11 pages.

*Primary Examiner* — Alyson M Merlino
(74) *Attorney, Agent, or Firm* — Young Basile Hanlon & MacFarlane, P.C.

(57) ABSTRACT

A camera housing includes a simplified draw latch for securing a first portion and a second portion of the camera housing together. The draw latch can include a draw hook and a wireform mid-linkage. The draw latch enables a user to easily open and close a camera housing, and to establish an air-tight or water-tight seal between the housing portions for use in various activities, including scuba diving.

11 Claims, 14 Drawing Sheets

(51) Int. Cl.
*G03B 17/08* (2006.01)
*H04N 5/225* (2006.01)
*B65D 45/24* (2006.01)
*E05C 5/00* (2006.01)
*E05B 15/04* (2006.01)

(52) U.S. Cl.
CPC .. *E05B 2015/0472* (2013.01); *Y10T 292/0911* (2015.04)

(58) Field of Classification Search
CPC ......... Y10T 292/0886; Y10T 292/0891; Y10T 292/0894; Y10T 292/09; Y10T 292/0899; Y10T 292/0902; Y10T 292/0905; Y10T 292/089; Y10T 292/20; Y10T 292/225; Y10S 292/49; Y10S 292/48; Y10S 292/11; Y10S 292/30; Y10S 292/50; E05B 15/0086; E05B 65/0817; E05B 2015/0462; E05B 2015/0472; E05B 2015/0493; E05C 19/14; E05C 19/145; G03B 17/08; G03B 2215/0542; B65D 45/00; B65D 45/025; B65D 45/06; B65D 45/08; B65D 45/16; B65D 45/20; B65D 45/22; B65D 45/24
USPC .................................................. 292/256.69
See application file for complete search history.

(56) References Cited

U.S. PATENT DOCUMENTS

| | | | | |
|---|---|---|---|---|
| 1,410,142 A * | 3/1922 | Thompson | ............. | B65D 45/24 215/280 |
| 1,420,892 A * | 6/1922 | Thompson | ............. | B65D 45/24 215/280 |
| 2,327,260 A * | 8/1943 | Greenman | ............. | E05C 19/14 292/114 |
| 2,941,834 A * | 6/1960 | Appleton | ................ | E05C 19/14 292/247 |
| 2,992,498 A * | 7/1961 | Mork | .................... | E02F 9/2841 267/158 |
| 3,022,101 A * | 2/1962 | Descarries | ............. | A47L 5/362 15/327.2 |
| 3,145,039 A * | 8/1964 | Richter | .................... | B63B 19/24 292/256.5 |
| 3,181,905 A * | 5/1965 | Bisbing | .................. | E05C 19/14 292/109 |
| 3,466,076 A * | 9/1969 | Bisbing | .................. | E05C 19/14 292/109 |
| 3,892,434 A * | 7/1975 | Caldwell | ................ | E05C 19/14 292/247 |
| 4,522,436 A * | 6/1985 | Hoen | ...................... | E05C 19/14 292/113 |
| 4,540,206 A * | 9/1985 | Frame | .................... | E05C 19/14 292/66 |
| 4,627,650 A * | 12/1986 | Hauschulte | ............. | E05C 19/14 292/113 |
| 4,668,061 A * | 5/1987 | Tamamura | ............. | G03B 17/08 396/29 |
| 4,705,308 A * | 11/1987 | Bisbing | .................. | E05C 19/14 292/108 |
| 4,782,673 A * | 11/1988 | Castelli | .................... | E05C 19/14 292/113 |
| 5,092,458 A * | 3/1992 | Yokoyama | ............. | A45C 11/38 206/316.2 |
| 5,127,684 A * | 7/1992 | Klotz | ...................... | E05C 19/14 292/113 |
| 7,568,739 B2 * | 8/2009 | Lee | .......................... | B25H 3/02 220/324 |
| 8,199,251 B2 | 6/2012 | Woodman | | |
| 2007/0071423 A1 | 3/2007 | Fantone et al. | | |
| 2008/0150301 A1 * | 6/2008 | Homner | ............... | B64D 11/003 292/95 |
| 2008/0309096 A1 * | 12/2008 | Andren | ................... | A45C 13/02 292/66 |
| 2011/0147245 A1 * | 6/2011 | Yim | ....................... | G03B 17/08 206/316.2 |

FOREIGN PATENT DOCUMENTS

| | | | | |
|---|---|---|---|---|
| DE | 1575335 A1 * | 9/1970 | ............. | E05C 19/14 |
| DE | 2736930 A1 * | 3/1979 | ............. | E05C 19/14 |
| DE | 102011000378 A1 * | 8/2012 | ............. | E05C 19/14 |
| FR | 1390393 A * | 2/1965 | ............. | E05C 19/14 |
| FR | 1426814 A * | 1/1966 | ............. | E05C 19/14 |
| GB | 556551 A * | 10/1943 | ............. | E05C 19/14 |
| JP | 2895447 B2 * | 5/1999 | ............. | E05C 19/14 |

* cited by examiner

SIMPLIFIED DRAW LATCH WITH BENT WIREFORM MID-LINKAGE

RELATED APPLICATIONS

This application claims priority to, and the benefit of, U.S. Provisional Application 61/856,606, titled "Simplified Draw Latch with Bent Wireform Mid-Linkage," filed Jul. 19, 2013, the contents of which are incorporated herein in its entirety by reference.

BACKGROUND

Technical Field

This disclosure relates to a camera system, and more specifically, to a flexible draw latch for a camera housing.

Description of the Related Art

Digital cameras are increasingly used in outdoors and sports environments. In order to allow for the safe use of cameras in such environments, the cameras need to be secured to camera mounts, which in turn can be secured to, for example, sports equipment, vehicles, or a user. One such means for securing a camera to a camera mount is a camera housing that securely encloses or partially encloses a camera. A user's experience with a camera housing can be diminished by difficult or complicated mechanisms for securing a camera within or removing a camera from the camera housing. In addition, the user's experience can be further complicated if the user wishes to completely enclose the camera for use in an environment that can damage the camera, such as underwater.

BRIEF DESCRIPTIONS OF THE DRAWINGS

The disclosed embodiments have other advantages and features which will be more readily apparent from the following detailed description of the invention and the appended claims, when taken in conjunction with the accompanying drawings, in which:

FIG. (or "Fig.") 1a illustrates a perspective view of a camera system, according to one embodiment.

DETAILED DESCRIPTION

The figures and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

Example Camera System Configuration

A camera system includes a camera and a camera housing structured to at least partially enclose the camera. The camera includes a camera body having a camera lens structured on a front surface of the camera body, various indicators on the front of the surface of the camera body (such as LEDs, displays, and the like), various input mechanisms (such as buttons, switches, and touch-screen mechanisms), and electronics (e.g., imaging electronics, power electronics, etc.) internal to the camera body for capturing images via the camera lens and/or performing other functions. The camera housing includes a lens window structured on the front surface of the camera housing and configured to substantially align with the camera lens, and one or more indicator windows structured on the front surface of the camera housing and configured to substantially align with the camera indicators. In one embodiment, the camera housing includes a draw latch to seal a first and a second base structure of the camera housing together.

Figure 1A:
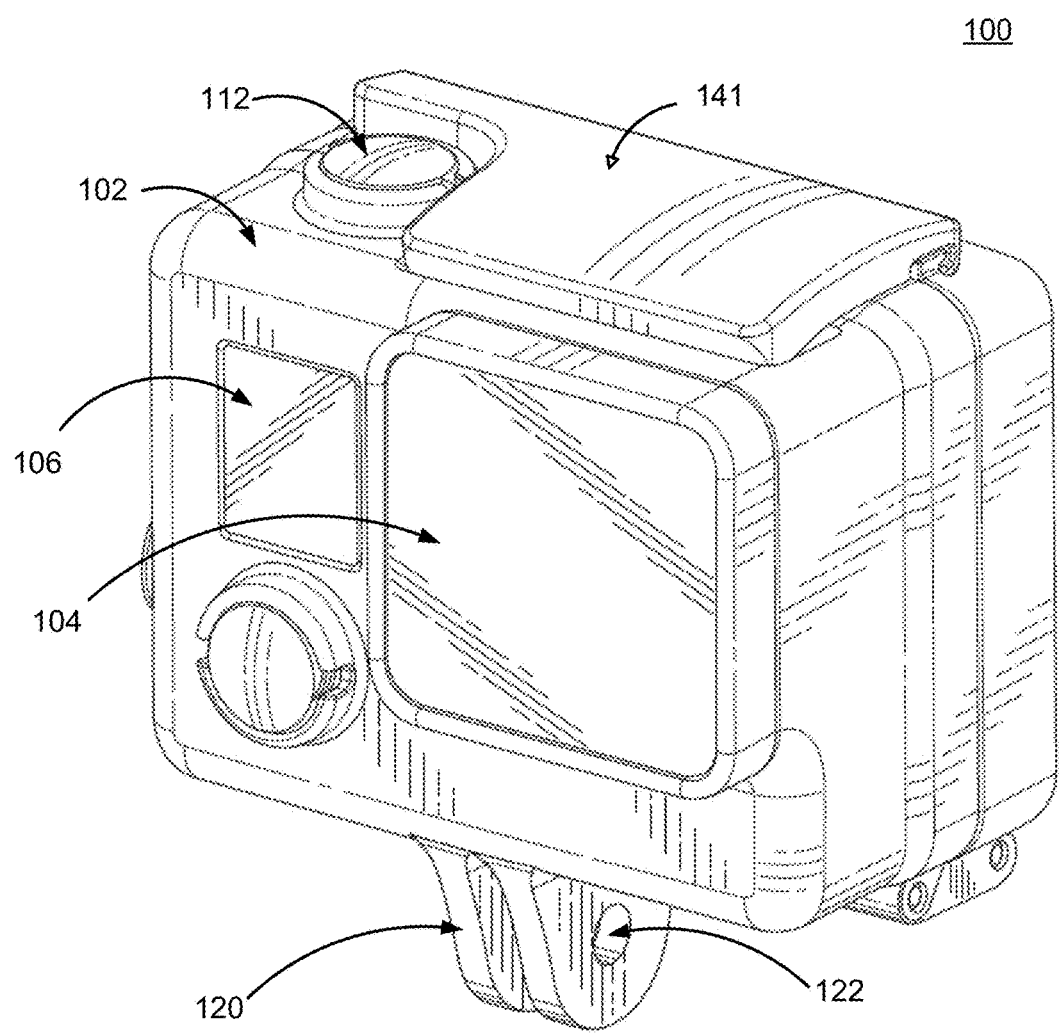
FIG. 1b illustrates another alternative perspective view of a camera system, according to one embodiment.
FIG. 1c illustrates a perspective view of a rear of the camera system, according to one embodiment.
Figure 1B:
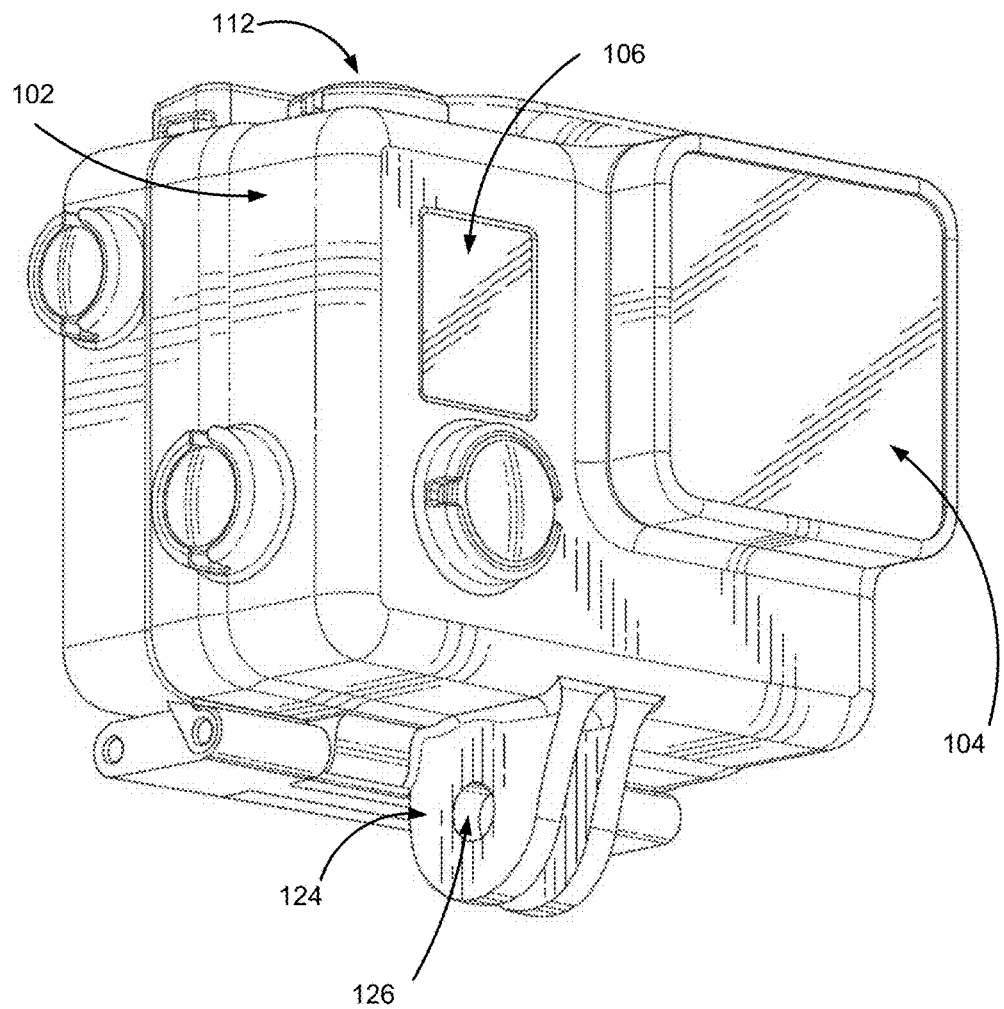

FIGS. 1a and 1b illustrate various views of a camera system according to one example embodiment. The camera system includes, among other components, a camera housing 100. The housing 100 includes a first base structure and a second base structure. In one embodiment, the first base structure is a first housing portion 102 and the second base structure is the second housing portion 128. In one embodiment, the first housing portion 102 includes a front face and four sides (i.e., a top side, bottom side, left side, and right side) structured to form a cavity that receives a camera (e.g. a still camera or video camera). In other embodiments, the camera housing 100 may not include one or more sides or faces. For instance, the camera housing 100 may not include a front or back face, allowing the front face and rear face of the camera to be exposed when partially enclosed by the top side, bottom side, left side, and right side of the camera housing 100. In one embodiment, the camera housing 100 has a draw latch 141, which latches together the first housing portion 102 and the second housing portion 128.

In one embodiment, the camera housing 100 has a small form factor (e.g., a height of approximately 2 to 6 centimeters, a width of approximately 2 to 7 centimeters, and a depth of approximately 1 to 4 centimeters), and is lightweight (e.g., approximately 50 to 150 grams). The camera housing 100 can be rigid (or substantially rigid) (e.g., plastic, metal, fiberglass, etc.) or pliable (or substantially pliable) (e.g., leather, vinyl, neoprene, etc.). In one embodiment, the camera housing 100 may be appropriately configured for use in various elements. For example, the camera housing 100 may comprise a waterproof enclosure that protects a camera from water when used, for example, while surfing or scuba diving.

Portions of the camera housing 100 may include exposed areas to allow a user to manipulate buttons on the camera that are associated with the camera functionality. Alternatively, such areas may be covered with a pliable material to allow the user to manipulate the buttons through the camera housing 100. For example, in one embodiment the top face of the camera housing 100 includes an outer shutter button 112 structured so that a shutter button of the camera is substantially aligned with the outer shutter button 112 when the camera is secured within the camera housing 100. The shutter button of the camera is operationally coupled to the outer shutter button 112 so that pressing the outer shutter button 112 allows the user to operate the camera shutter button.

In one embodiment, the front face of the camera housing 100 includes a lens window 104 structured so that a lens of the camera is substantially aligned with the lens windows 104 when the camera is secured within the camera housing 100. The lens window 104 can be adapted for use with a conventional lens, a wide angle lens, a flat lens, or any other specialized camera lens. In this embodiment, the lens window 104 comprises a waterproof seal so as to maintain the waterproof aspect of the housing 100.

In one embodiment, the camera housing 100 includes an indicator window 106 structured so that one or more camera indicators are substantially aligned with the indicator window 106 when the camera is secured within the camera housing 100. The indicator window 106 can be any shape or size, and can be made of the same material as the remainder of the camera housing 100, or can be made of any other material, for instance a transparent or translucent material and/or a non-reflective material.

The described housing 100 may also be adapted for a wider range of devices of varying shapes, sizes and dimensions besides cameras. For example, an expansion module may be attached to housing 100 to add expanded features to any electronic device, such as cell phones, music players, personal digital assistants ("PDAs"), global positioning system ("GPS") units, or other portable electronic devices.

Figure 1C:
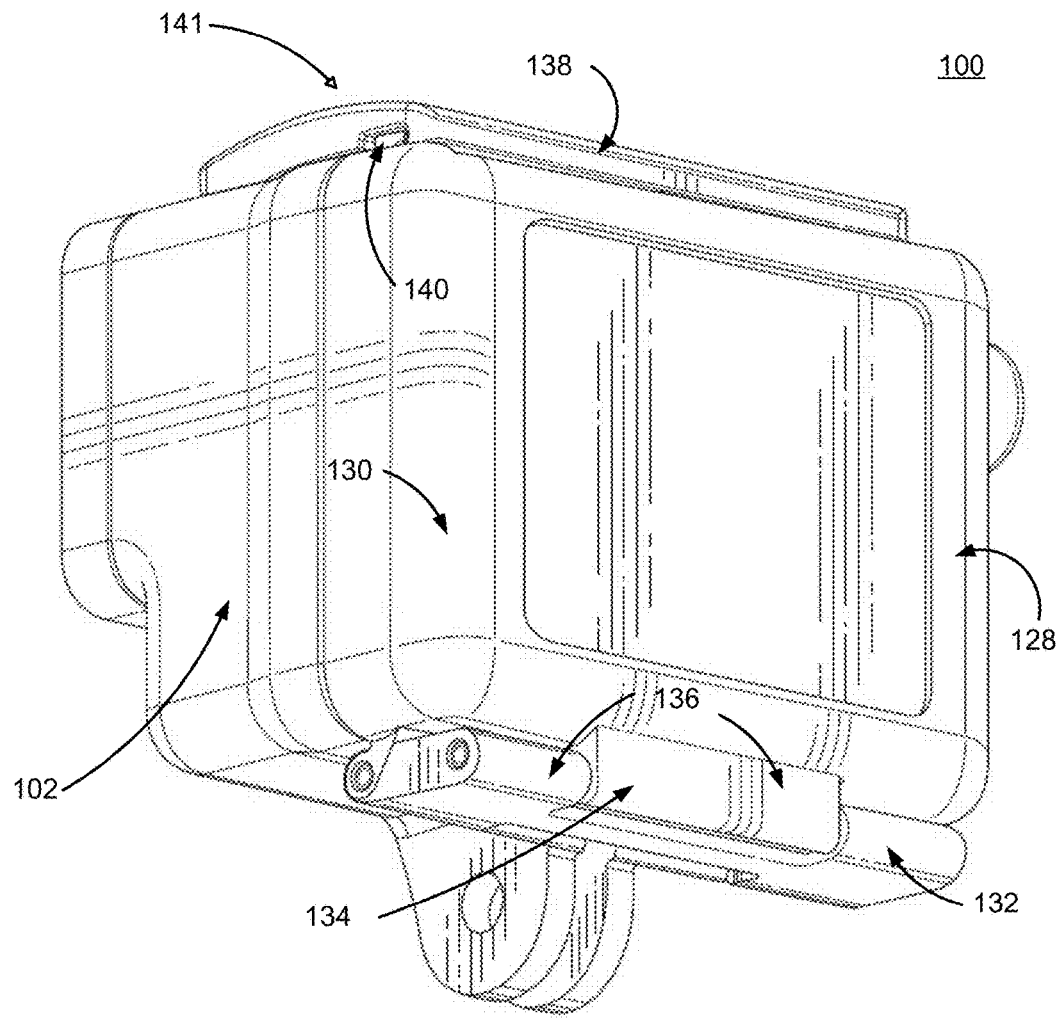

FIG. 1c is a rear perspective view of the camera housing 100 illustrating a second base structure, according to one embodiment. In one embodiment, the second base structure is a second housing portion 128. The second housing portion 128 detachably couples with a first base structure. In one embodiment, the first base structure is the first housing portion 102 opposite the front face of the first housing portion 102. The first housing portion 102 and second housing portion 128 are collectively structured to enclose a camera within the cavity when the second housing portion 128 is secured to the first housing portion 102 in a closed position.

In one embodiment, the second housing portion 128 includes a door 130 that allows the camera to be removed from the housing 100. The door 130 pivots around a hinge 136 that allows the door 130 to be opened or shut. In one embodiment, the door 130 comprises a panel hook lip 140 and a draw hook 142 comprising a draw hook lip end 138 is located on the top face of the camera housing 100. In one embodiment, the draw hook lip end 138 detachably couples to the panel hook lip 140 on the door 130. The draw hook lip end 138 and the panel hook lip 140 secure the door 130 to the first portion 102 of the camera housing 100 in a closed position when coupled, as illustrated in FIG. 1a. In one embodiment, the draw hook lip end 138 comprises a hook-shaped lateral bar and the panel hook lip 140 comprises an L-shaped bar. The draw hook lip end 138 can pivot upwards to allow the door 130 to close and can then be pressed down around the panel hook lip 140 to hold the door 130 in the closed position. See FIGS. 4A and 4B for a detailed illustration of the draw latch 141. In different embodiments, fastening structures for securing the door 130 can include, for example, a button assembly, a buckle assembly, a clip assembly, a hook and loop assembly, a magnet assembly, a ball and catch assembly, an adhesive assembly, or any other type of securing mechanism.

In one alternative embodiment, the hinge 136 is instead located on the top face of the housing 100 and the fastening structures 138, 140 are instead located on the bottom face of the housing 100. The hinge 136 and fastening structures 138, 140 may be located on opposite side faces of the camera housing 100 (such as the left side face and the right side face).

In one embodiment, the housing 100 includes a watertight seal so that the housing 100 is waterproof when the door 130 is shut. For example, in one embodiment, the door 130 includes a sealing structure positioned on interior edges of the door 130. The sealing structure provides a seal between the first portion of the camera housing 102 and the door 130 when the draw hook lip end 138 is coupled to the panel hook lip 140 on the top edge of the door 130. The seal can be airtight and/or watertight.

In one embodiment, an outer hinge structure 132 on the bottom edge of the second housing portion 128 detachably couples to an inner hinge structure 134 on the bottom edge of the first housing portion 102 to form the hinge 136. For example, in one embodiment, the outer hinge structure 132 comprises one or more hook-shaped protrusions structured to securely fasten to a rod-shaped member of the inner hinge structure 134. Other mechanisms for coupling the second housing portion 128 to the housing 100 may also be used in various alternative embodiments. In other embodiments, the second housing portion 128 may be permanently attached to the first housing portion 102.

Figure 2A:
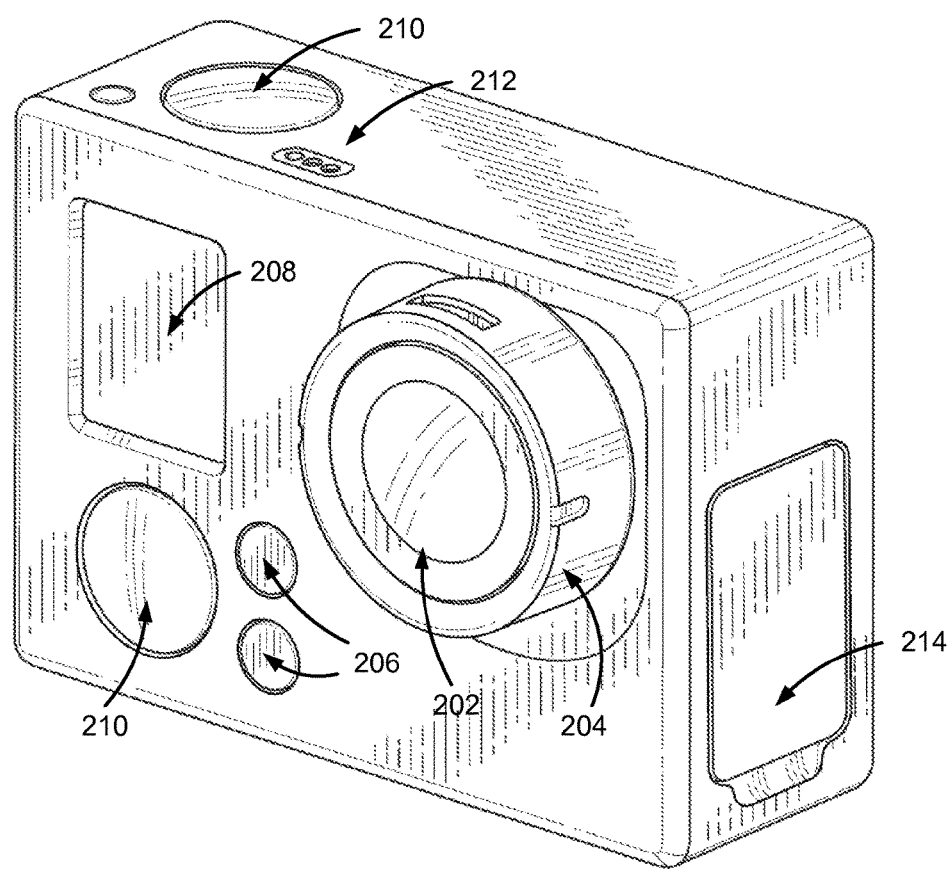
FIG. 2a illustrates a perspective view of a camera for use with the camera system, according to one embodiment.

FIG. 2a illustrates a camera 200 for use with the camera systems described herein, according to one example embodiment. The camera 200 is configured to capture images and video, and to store captured images and video for subsequent display or playback. The camera 200 is adapted to fit within a camera housing, such as the housing 100 discussed above or any other housing described herein. As illustrated, the camera 200 includes a lens 202 configured to receive light incident upon the lens and to direct received light onto an image sensor internal to the lens. The lens 202 is enclosed by a lens ring 204. The camera 200 includes indicator lights 206, a display 208, buttons 210, a microphone 212, and a removable door 214 covering one or more camera communicative interfaces.

Figure 2B:
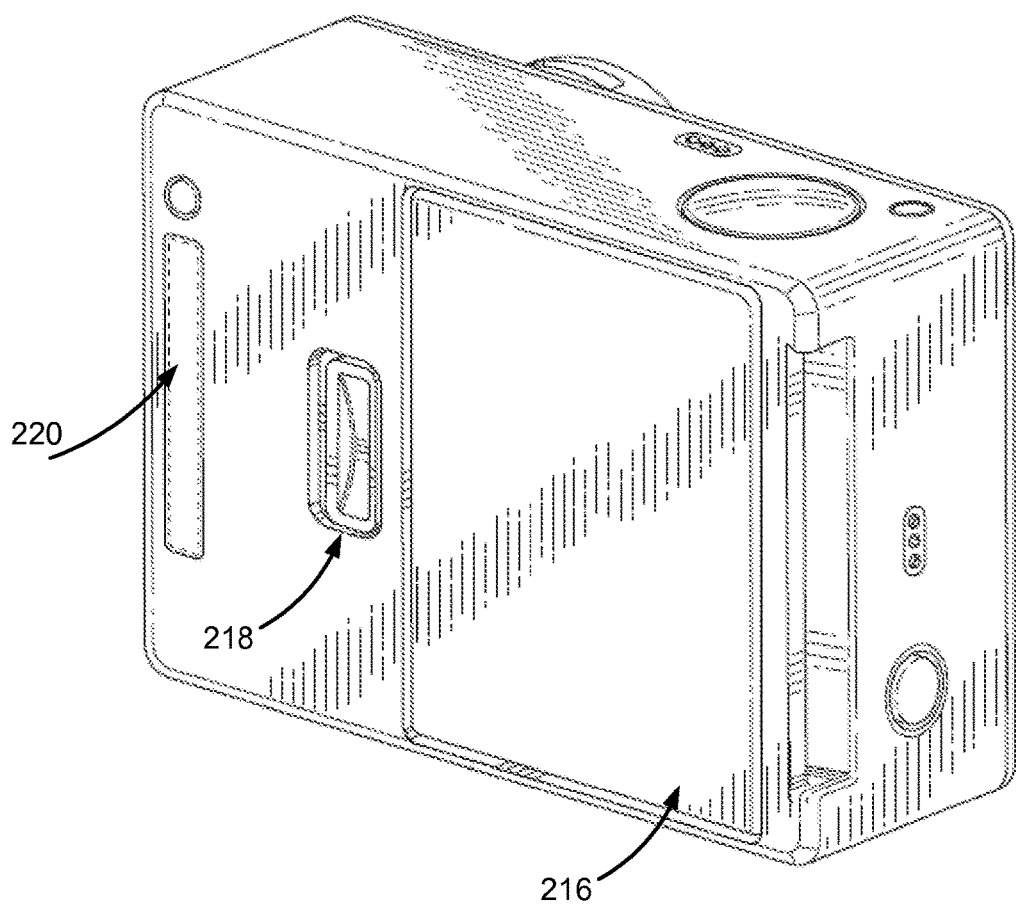
FIG. 2b illustrates a perspective view of a rear of a camera for use with the camera system, according to one embodiment.

FIG. 2b illustrates a perspective view of a rear of a camera 200 for use with the camera system, according to one embodiment. The camera 200 includes a door 216 that covers a removable battery and battery interface. The door 216 can be removed via the door release mechanism 218. The camera also includes an expansion pack interface 220 configured to receive a removable expansion pack, such as a display module, an extra battery module, a wireless module, and the like. Removable expansion packs, when coupled to the camera 200, provide additional functionality to the camera via the expansion pack interface 220.

Example Draw Latch Configuration

Figure 3:
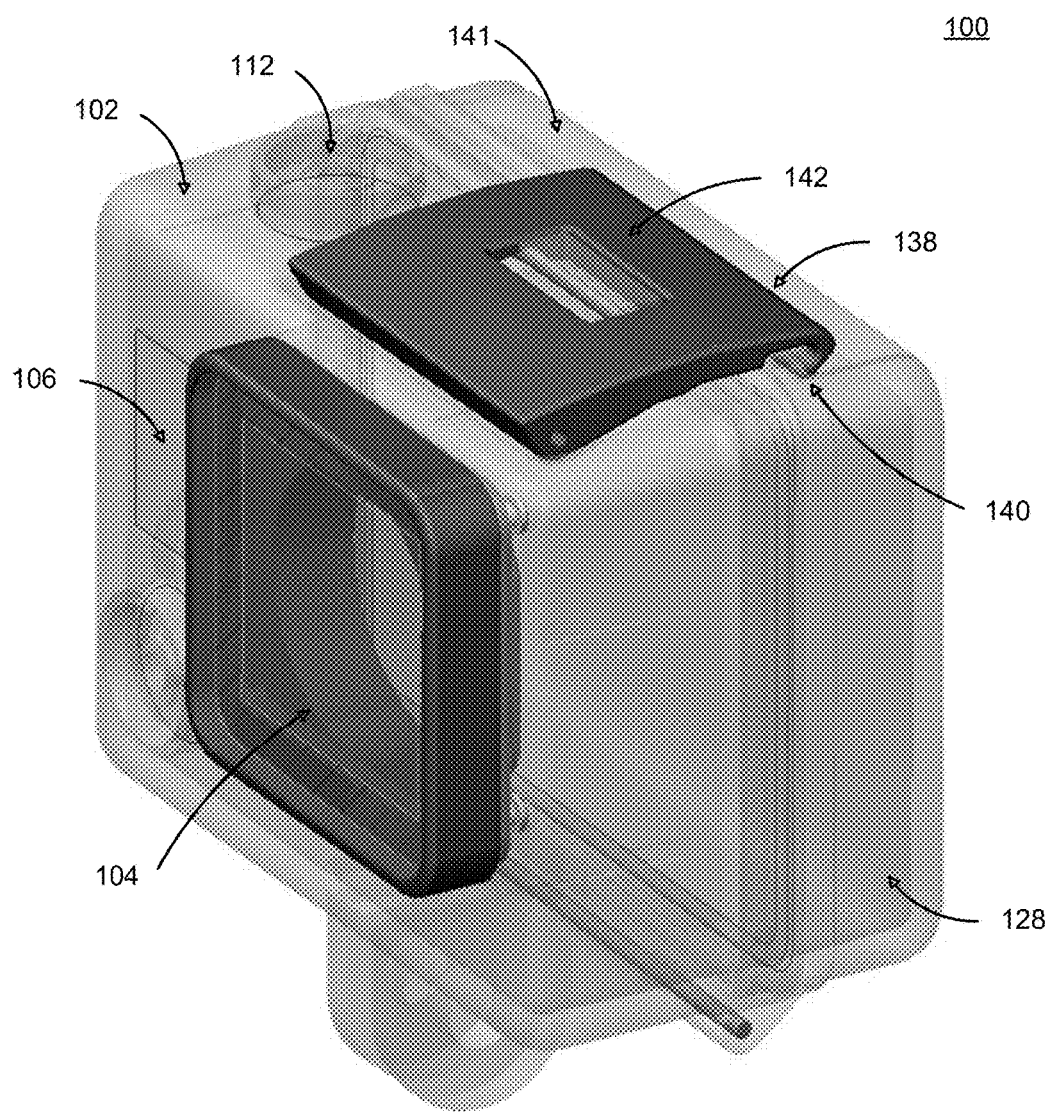
FIG. 3 illustrates a perspective view of the top of a draw latch on the top of a camera system, according to one embodiment.

Referring now to FIG. 3, it illustrates a perspective view of one embodiment of the top of a draw latch 141 on the top of the camera housing 100. The draw latch 141 shows one embodiment of a draw hook 142, comprising a draw hook lip end 138 coupled to a second housing portion 128 at a panel hook lip 140. The draw hook 142 secures a first housing portion 102 to the second housing portion 128.

Figure 4A:
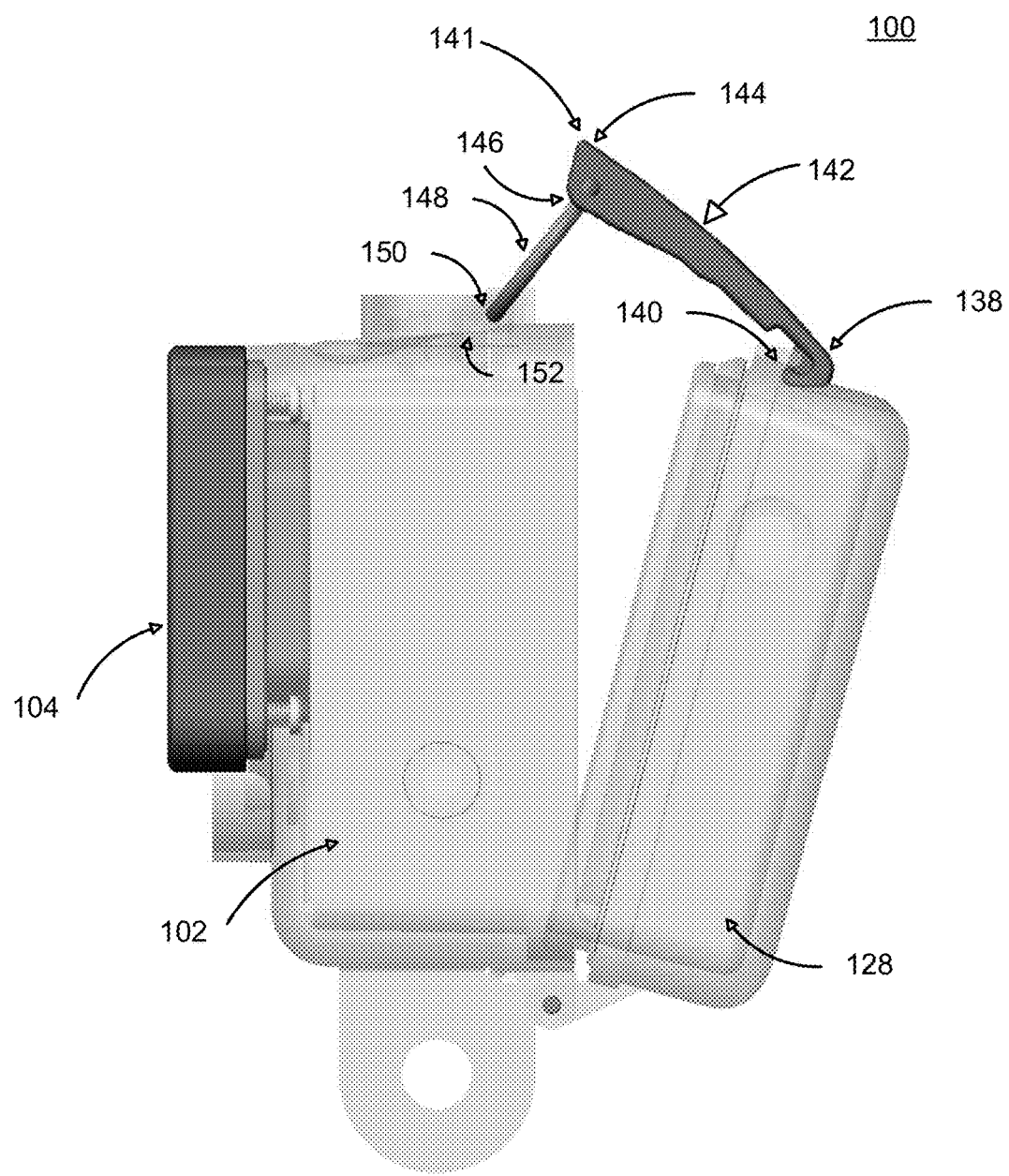
FIG. 4a illustrates a side view of the camera system and the draw latch, according to one embodiment.

FIG. 4a illustrates a side view of one embodiment of the camera housing 100 and the draw latch 141. In one embodiment, the draw latch 141 connects a first housing portion 102 with a second housing portion 128, and includes a draw hook 142 and a bent wireform mid-linkage 148. The draw hook 142 includes a draw hook lip end 138 and a draw hook hinge end 144. The draw hook lip end 138 is pivotally and detachably coupled to a panel hook lip 140 on the second housing portion 128. The bent wireform mid-linkage 148 includes a draw hook axis 146 and a panel base axis 150. The draw hook axis 146 is pivotally coupled to the draw hook hinge end 144 of the draw hook 142 and the panel base axis 150 is pivotally coupled to a panel base hinge 152 on the first housing portion 102.

Figure 4B:
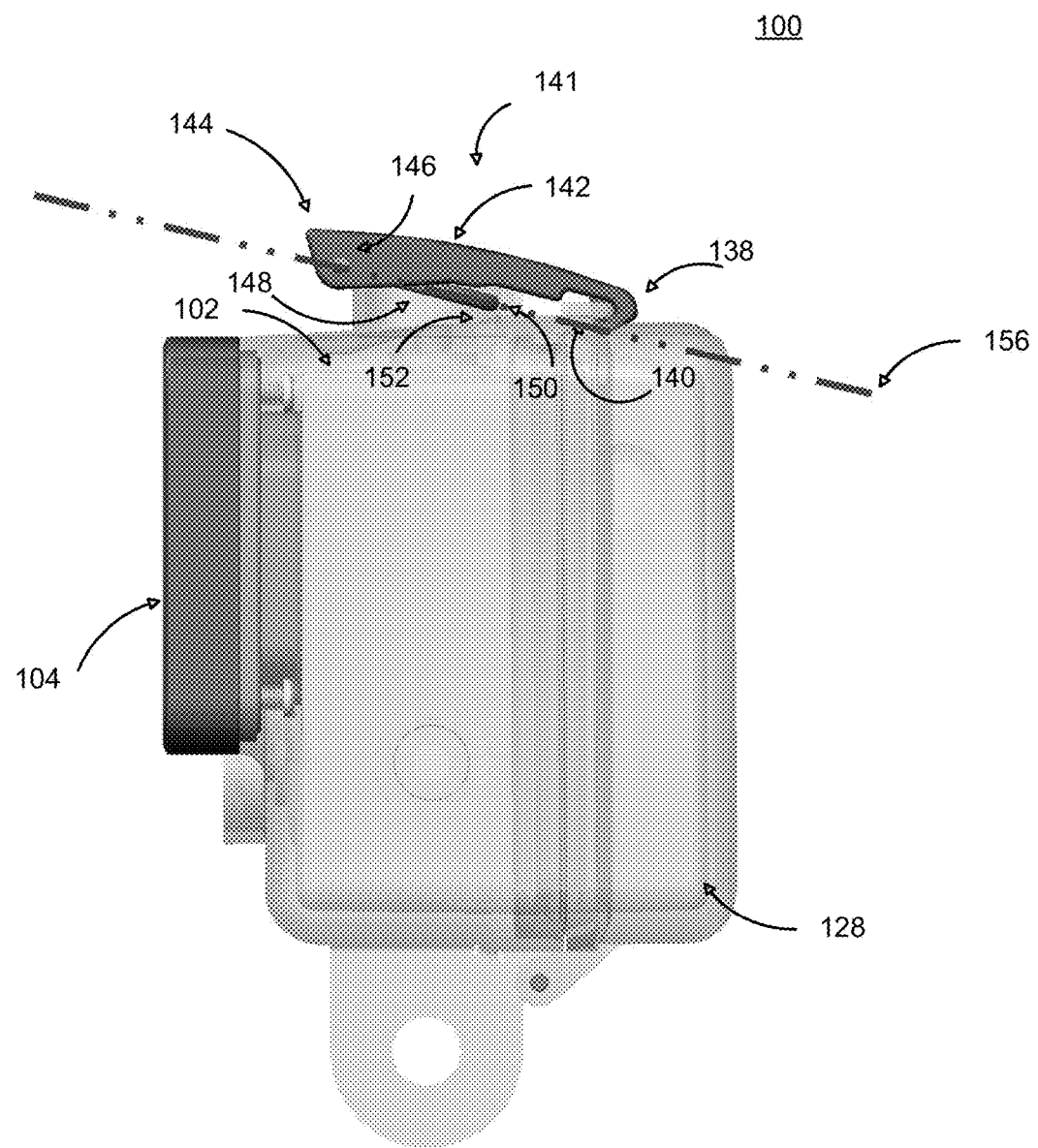
FIG. 4b illustrates a side view of the camera system and the draw latch in the over-center alignment position, according to one embodiment.

FIG. 4b illustrates a side view of one embodiment of the camera housing 100 and the draw latch 141 in the over-center alignment 156 position. The over-center alignment 156 is defined by the alignment of three coupled sections: a draw hook axis 146 coupled with a draw hook hinge end 144, a panel base axis 150 coupled with a panel base hinge 152, and a draw hook lip end 138 coupled with a panel hook lip 140.

In one embodiment, the bent wireform mid-linkage 148 has a small form factor (e.g., a diameter of approximately 1.37 millimeters), and is lightweight (e.g., approximately 0.77 grams). The bent wireform mid-linkage 148 can be rigid (or substantially rigid) and made of a material with spring or compressible properties (e.g., plastic, metal, carbon fiber etc.). For instance, the spring constant (k) of the bent wireform mid-linkage 148 can increase by a factor of the diameter of the bent wireform mid-linkage 148 raised to the power of 2.5. In other example embodiments, the material, size/shape, and diameter of the bent wireform mid-linkage 148 can be altered for each application as needed to optimize for clamping forces, cost, and other environmental concerns.

Figure 5:
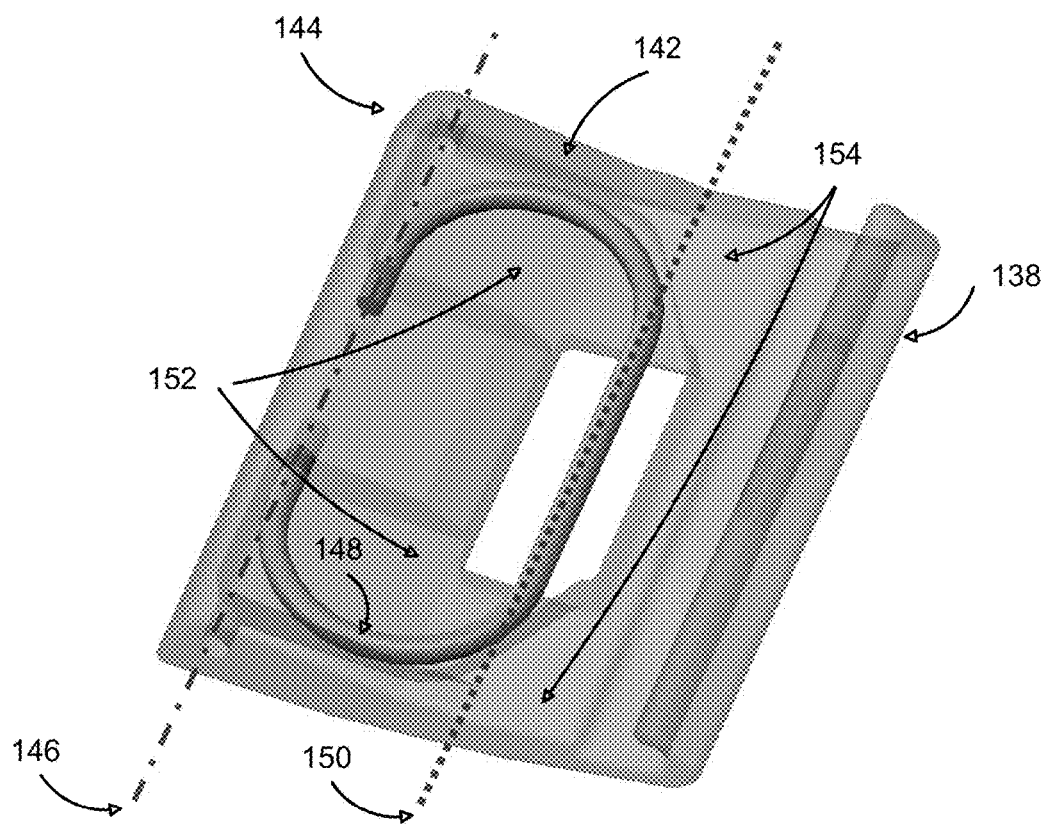
FIG. 5 illustrates the bottom view of the draw latch when the camera system is in a closed state, as illustrated in FIG. 3, according to one embodiment.

FIG. 5 illustrates a bottom view of the draw latch 141 when the camera housing 100 is in a closed state (or resting state). An example of the closed state is illustrated in FIG. 3. The bent wireform mid-linkage 148 is pivotally coupled to the draw hook 142 at the draw hook hinge end 144 along a draw hook axis 146. In the closed state, the draw hook 142 and the bent wireform mid-linkage 148 are rotated so that the bent wireform mid-linkage 148 fits into a mid-linkage cavity 152 of the draw latch 141. In one example embodiment, the bent wireform mid-linkage 148 is flush (or substantially flush) with a raised inner surface 154 of the draw latch 141.

Figure 6:
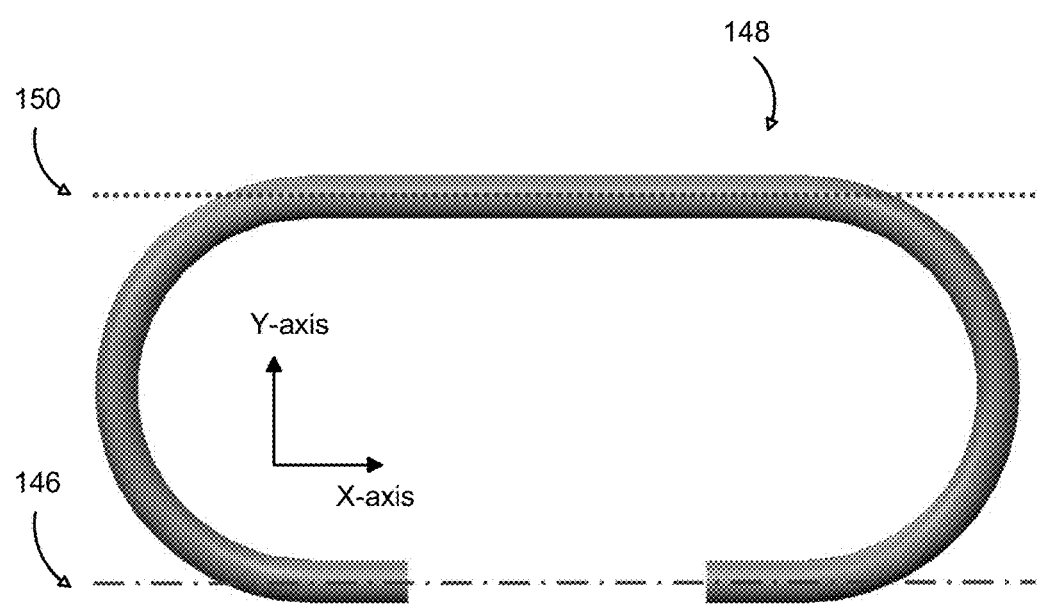
FIG. 6 illustrates a bent wireform mid-linkage relative to an x- and y-axis, according to one embodiment.

FIG. 6 illustrates one embodiment of the bent wireform mid-linkage 148 relative to an x- and y-axis. The bent wireform mid-linkage 148 comprises a draw hook axis 146 and a panel base axis 150. The illustrated configuration shows the wireform mid-linkage 148 in a c-shape in this example embodiment. In an alternate example embodiment, the wireform mid-linkage 148 can be a loop shape, or any other suitable shape.

Figure 7A:
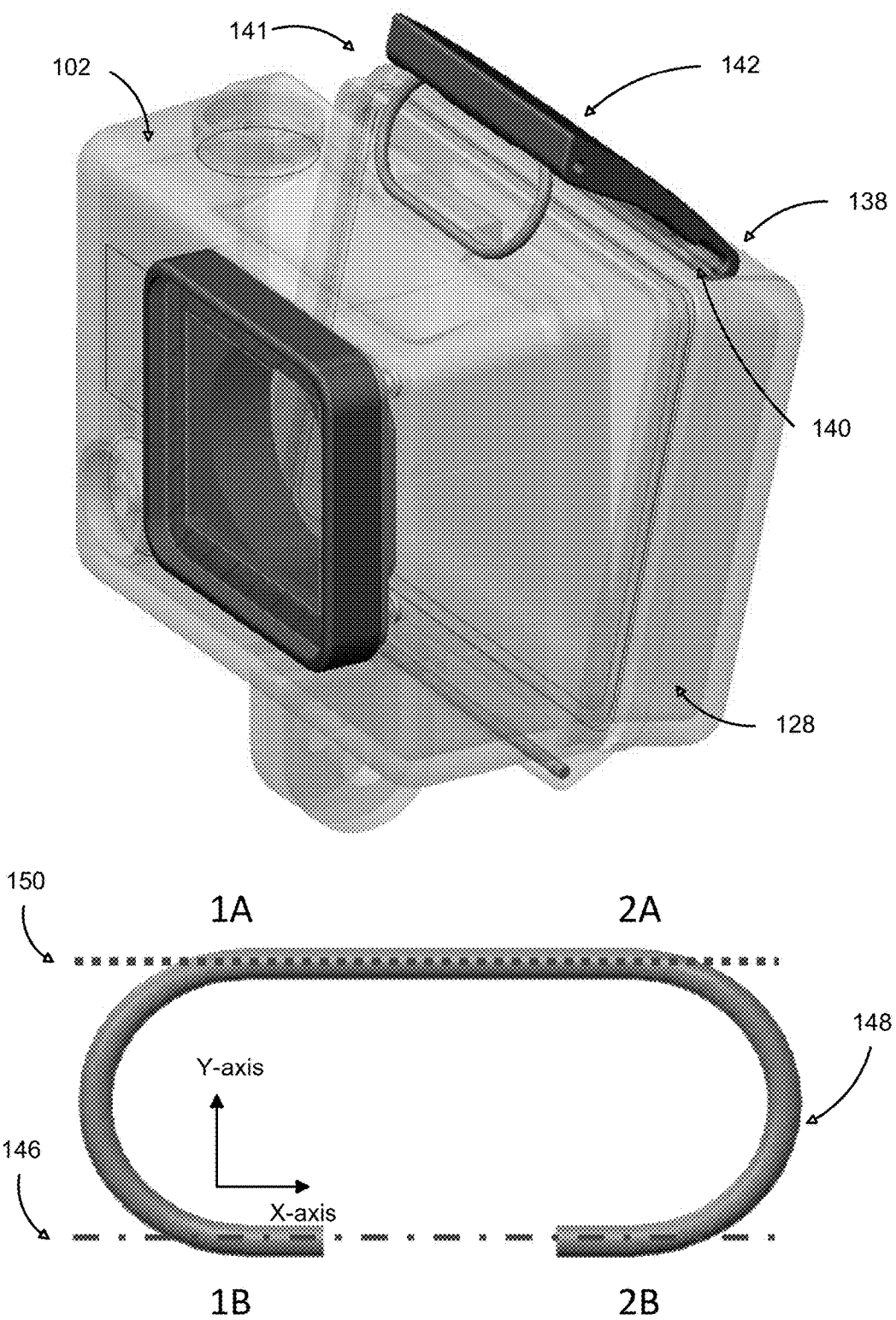
FIG. 7a illustrates a camera housing and draw latch in a fully open state, according to one embodiment.

Referring now to FIGS. 7a-7d, illustrated is an example operation of the draw latch 141 including the effects of various forces on the wireform mid-linkage 148 in each state of the draw latch 141 as it moves from a start state (e.g., open) to intermediate states and an end state (e.g., closed). FIG. 7a illustrates a camera housing 100 and draw latch 141 in a fully open state. The draw latch 141 comprises a draw hook 142 and a bent wireform mid-linkage 148. In the fully open state, there are only minimal forces acting on the bent wireform mid-linkage 148. As the draw latch 141 is prepared for closure, the draw hook lip end 138 is positioned to catch a panel hook lip 140 (or other catch structure) on the second portion housing 128. One end of the wireform mid-linkage 148 (e.g., the base axis 150) is secured pivotally to the first portion of the housing 102 (for instance via a lip or other catch strure). As the operation is further described, reference is made to the isolated view of the wireform mid-linkage 148, with notation of the two axes, e.g., the draw hook axis 146, the panel base axis 150, and forces on each side of the wireform mid-linkage 148 at points 1A, 2A and 1B, 2B.

Figure 7B:
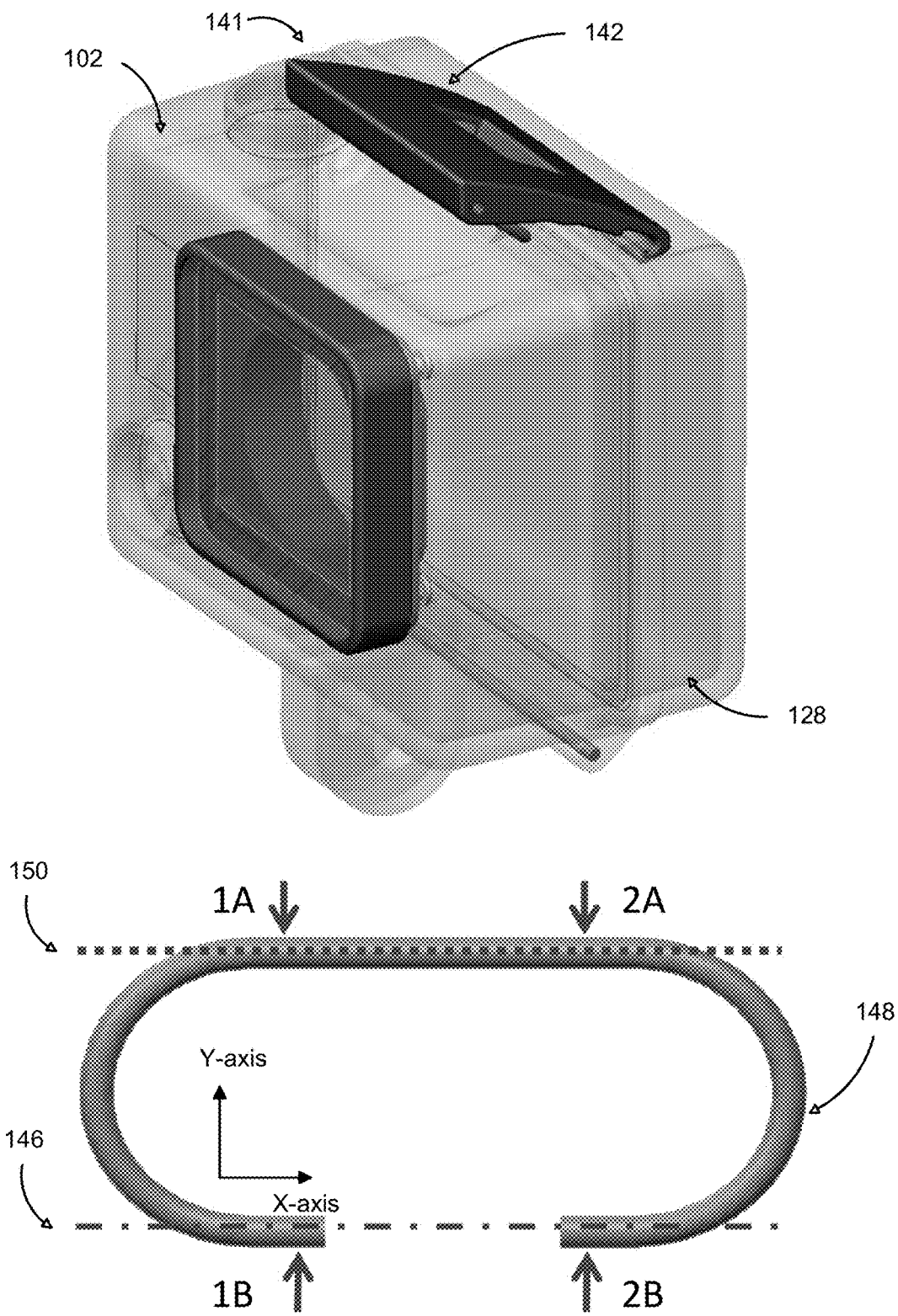
FIG. 7b illustrates a camera housing and draw latch in a partially open state, according to one embodiment.

Next, FIG. 7b illustrates a camera housing 100 and draw latch 141 in a partially open state, according to one embodiment. The partially open state is an intermediate state, which is between the open state and the closed state. In the partially open state, there are compressive forces acting on the bent wireform mid-linkage 148, decreasing the distance between the draw hook axis 146 and the panel base axis 150. The compressive forces compress the wireform mid-linkage 148 such that the distances between points 1A and 1B and between points 2A and 2B are reduced. The compressive force on the wireform mid-linkage 148 is generated when the force (or pressure) on the draw hook 142 is applied over, downward, and towards the first housing portion 102. As the downward force is applied on the draw hook 142, the compressive force on the wireform mid-linkage 148 increases. As the compressive force on the wireform mid-linkage 148 increases, the distance between 1A and 2A and between 1B and 2B decreases. Accordingly, the distance between 1A and 2A and between 1B and 2B is smaller in the partially open state than in the fully open state of FIG. 7a.

Figure 7C:
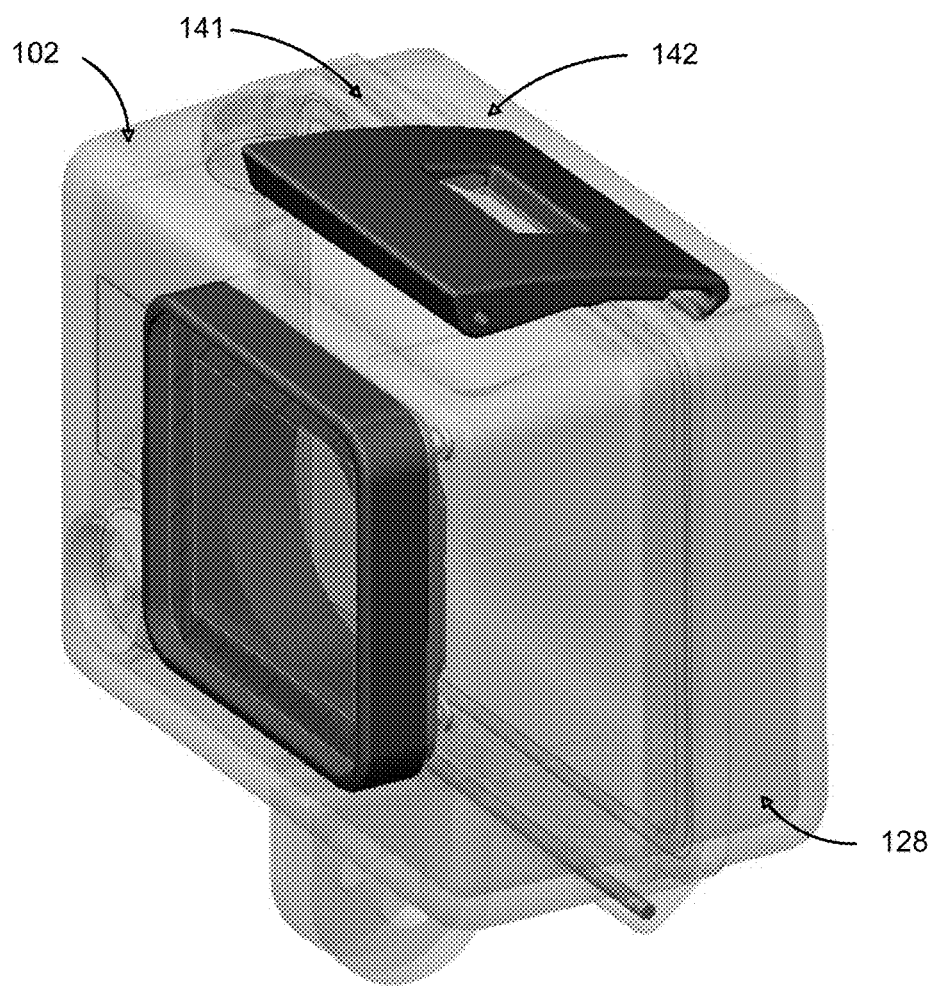
FIG. 7c illustrates a camera housing and draw latch in an over-center state, according to one embodiment.
Figure 7C:
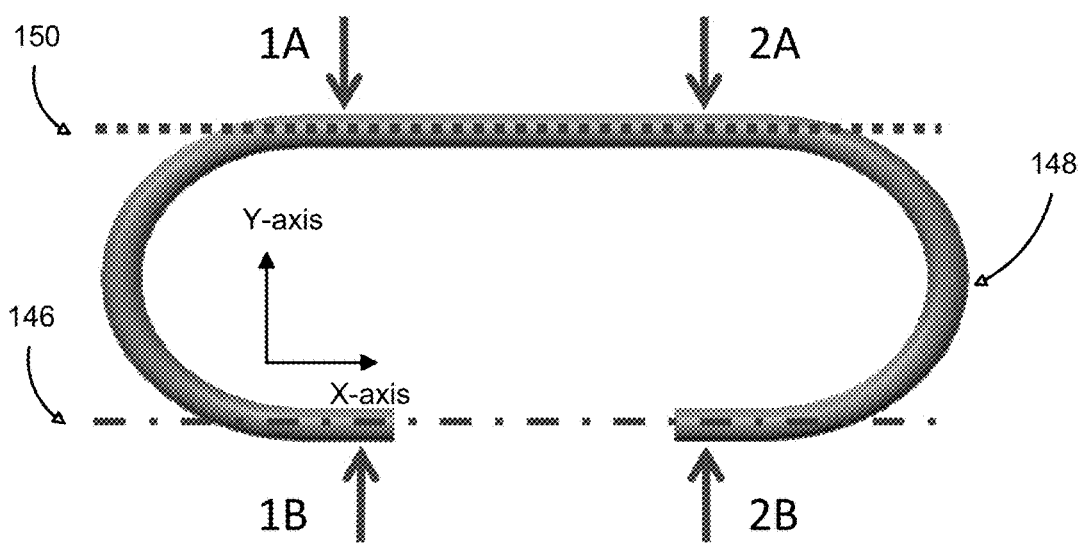

FIG. 7c illustrates a camera housing 100 and draw latch 141 in an over-center state, according to one embodiment. The over-center state of the draw latch 141 is the result of the compressive force on the draw latch 141 (as a result of the movement of the draw latch 141 downward toward the first housing portion 102) continuing to increase past the partially open state. In the over-center state, the compressive forces acting on the bent wireform mid-linkage 148 continue to increase, which continues to decrease the distance between the draw hook axis 146 and the panel base axis 150. The compressive forces on the bent wireform mid-linkage 148 are the maximum in the over-center state. In one embodiment, there are over-stroke stops in the first housing portion to help prevent over-compression when the wireform mid-linkage 148 is compressed during the closing of the draw latch 141 (as illustrated in FIG. 3). In the over-center state (as illustrated in FIG. 4b), the y-axis of the bent wireform mid-linkage 148 is in line with the engaged draw hook lip end 138 and panel hook lip 140. In this position, the compressive forces acting upon the wireform mid-linkage 148 are exerted outward from the first housing portion 102 along the axis 156, causing a reciprocal force to be exerted outward on the draw hook 142 along the axis 156, which in turn cause the second housing portion 128 to be forcibly compressed into the first housing portion 102.

In the over-center state (as illustrated in FIG. 4b), the distance between 1A and 1B and the distance between 2A and 2B of the bent wireform mid-linkage 148 is smaller than the distance between 1A and 1B and the distance between 2A and 2B, respectively, in the fully open state and the partially open state.

Figure 7D:
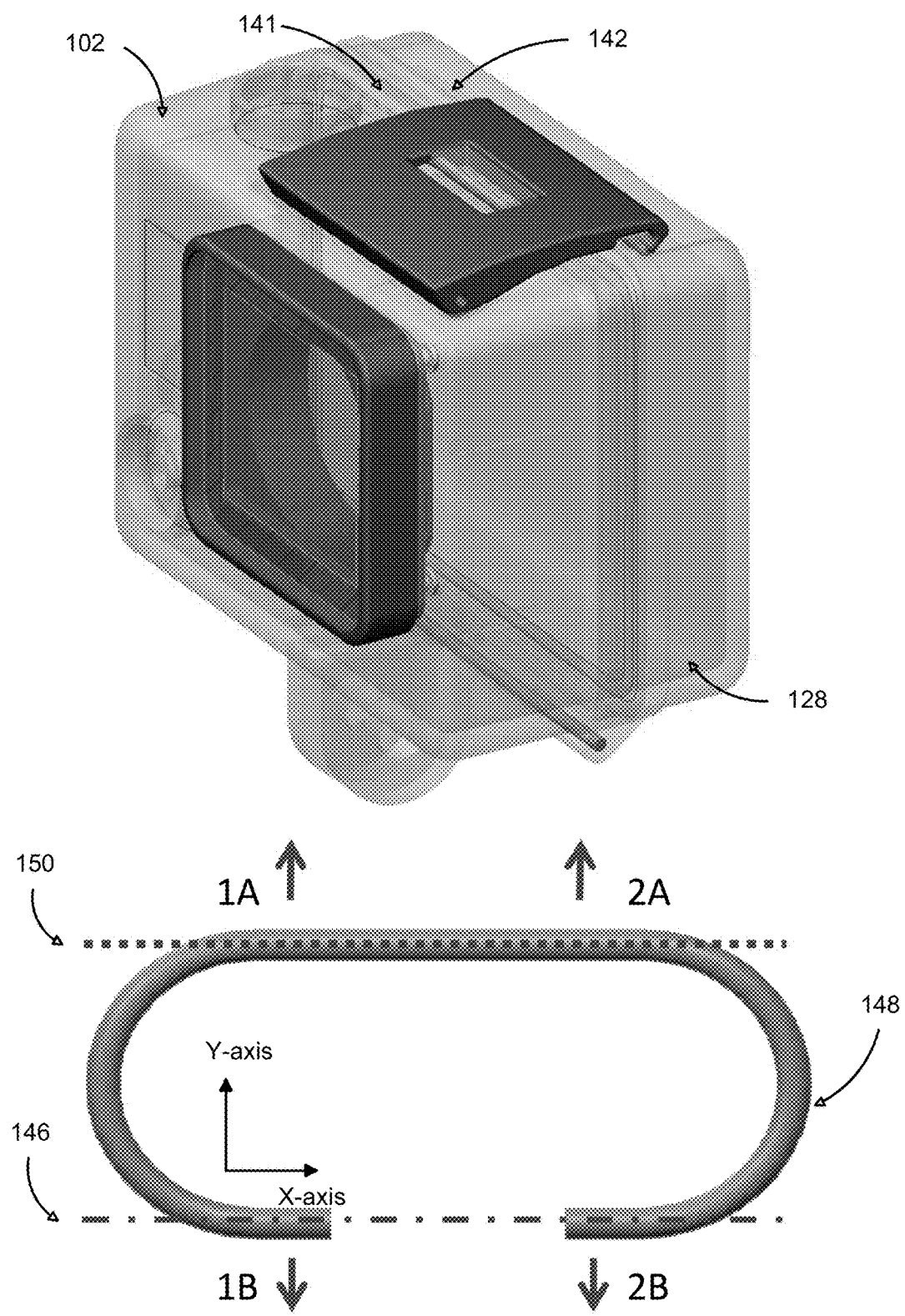
FIG. 7d illustrates a camera housing and draw latch in a closed state, according to one embodiment.

FIG. 7d illustrates a camera housing 100 and draw latch 141 in a closed state, according to one embodiment. When the draw latch 141 is moved from the over-center state to the closed state, the compressive forces acting on the wireform mid-linkage 148 are reduced (relative to the compressive forces acting on the wireform mid-linkage 148 in the over-center state), securing the draw latch 141 in the closed state, and securely coupling the first housing portion 102 to the second housing portion 128. When the first housing portion 102 is securely coupled to the second housing portion, an airtight and/or watertight seal can be established between the two housing portions. To decouple the first housing portion 102 and the second housing portion 128, a user can pull upward on the draw latch 141, causing the compressive forces acting on the wireform mid-linkage 148 to increase as the draw latch 141 transitions from the closed state to the over-center state.

Additional Configuration Considerations

It should be noted that while the embodiments described herein are drawn toward a camera housing, in practice, the draw latch described herein is equally applicable to any type of housing, such as a mobile phone housing, a video camera housing, a watch housing, a computing device housing, or the housing for any other suitable object.

The disclosed configuration provides a latching assembly that incorporates fewer parts thereby reducing costs and providing manufacturing simplicity. Moreover, the principles disclosed herein for the latch can be applied to other products where two components are desired to be coupled together with a latch type configuration.

Throughout this specification, some embodiments have used the expression "coupled" along with its derivatives. The term "coupled" as used herein is not necessarily limited to two or more elements being in direct physical or electrical contact. Rather, the term "coupled" may also encompass two or more elements are not in direct contact with each other, but yet still co-operate or interact with each other, or are structured to provide a thermal conduction path between the elements.

Likewise, as used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus.

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

Finally, as used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Upon reading this disclosure, those of skill in the art will appreciate still additional alternative structural and functional designs as disclosed from the principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. A draw latch for securely coupling a first housing portion to a second housing portion, the draw latch comprising:
    a panel base hinge coupled to the first housing portion;
    a panel hook lip coupled to the second housing portion;
    a draw hook comprising a draw hook hinge end and a draw hook lip end, the draw hook lip end detachably coupled with the panel hook lip; and
    a bent wireform mid-linkage having a unibody structure, the bent wireform mid-linkage comprising a wire having a cross-sectional shape with a constant radius, the wire of the bent wireform mid-linkage comprising a straight segment pivotally coupled to the panel base hinge and extending between a first end of each of two curved segments, each of the two curved segments having a uniform 180-degree curvature and each coupled to a different additional straight segment, protruding linearly from a second end of each curved segment, the additional straight segments are aligned and separated by a spatial separation and each are pivotally coupled with the draw hook hinge end of the draw hook;
    wherein the bent wireform mid-linkage is configured to operate in at least four states comprising:
        a fully open state, wherein the bent wireform mid-linkage is fully decompressed;
        a partially open state, wherein the bent wireform mid-linkage is partially compressed, but where the draw hook hinge end of the draw hook is not adjacent to the first housing portion;
        an over-center state, wherein the bent wireform mid-linkage is compressed more than in the partially open state; and
        a closed state, wherein the bent wireform mid-linkage is compressed less than in the over-center state, and where the draw hook hinge end of the draw hook is adjacent to the first housing portion; and
    wherein the bent wireform mid-linkage is configured to fit into a mid-linkage cavity within the draw hook when the draw hook is in the closed state such that the bent wireform mid-linkage is flush with a raised inner surface of the draw hook.

2. The draw latch of claim 1, wherein the wire of the bent wireform mid-linkage comprises a substantially c-shape.

3. The draw latch of claim 1, wherein the wire of the bent wireform mid-linkage comprises a substantially o-shape.

4. The draw latch of claim 1, wherein the first housing portion is securely coupled to the second housing portion when the bent wireform mid-linkage is configured in the closed state such that the first housing portion and the second housing portion form a water-tight seal.

5. A draw latch for securely coupling a first camera housing portion to a second camera housing portion, the draw latch comprising:

a draw hook comprising a draw hook hinge end and a draw hook lip end, the draw hook lip end detachably coupled with the second camera housing portion; and a bent wireform mid-linkage having a unibody structure, the bent wireform mid-linkage comprising a wire having a cross-sectional shape with a constant radius, the wire of the bent wireform mid-linkage comprising a straight segment pivotally coupled to the panel base hinge and extending between a first end of each of two curved segments, each of the two curved segments having a uniform 180-degree curvature and each coupled to a different additional straight segment protruding linearly from a second end of each curved segment, the additional straight segments are aligned and separated by a spatial separation and each are pivotally coupled with the draw hook hinge end of the draw hook;

wherein the bent wireform mid-linkage is configured to operate in at least four states comprising:
- a fully open state, wherein the bent wireform mid-linkage is fully decompressed;
- a partially open state, wherein the bent wireform mid-linkage is partially compressed, but where the draw hook hinge end of the draw hook is not adjacent to the first housing portion;
- an over-center state, wherein the bent wireform mid-linkage is compressed more than in the partially open state; and
- a closed state, wherein the bent wireform mid-linkage is compressed less than in the over-center state, and where the draw hook hinge end of the draw hook is adjacent to the first housing portion; and wherein the bent wireform mid-linkage is configured to fit into a mid-linkage cavity within the draw hook when the draw hook is in the closed state such that the bent wireform mid-linkage is flush with a raised inner surface of the draw hook.

6. The draw latch of claim 5, wherein the wire of the bent wireform mid-linkage comprises a substantially c-shape.

7. The draw latch of claim 5, wherein the wire of the bent wireform mid-linkage comprises a substantially o-shape.

8. The draw latch of claim 5, wherein the first camera housing portion is securely coupled to the second camera housing portion when the bent wireform mid-linkage is configured in the closed state such that the first camera housing portion and the second camera housing portion form a water-tight seal.

9. A draw latch for securing a first housing portion to a second housing portion, the draw latch comprising:

a panel base hinge coupled to the first housing portion; a panel hook lip coupled to the second housing portion;

a draw hook comprising a draw hook hinge end and a draw hook lip end, the draw hook lip end detachably coupled with the panel hook lip; and a bent wireform mid-linkage comprising a wire having a cross-sectional shape with a constant radius, the wire of the bent wireform mid-linkage comprising first and second curved portions, each with a uniform 180-degree curvature, a first segment coupling the first and second curved portions to one another and extending linearly between a first end of each of the first and second curved portions, a second segment extending linearly from a second end of the first curved portion, and a third segment extending linearly from a second end of the second curved portion, wherein the second segment and the third segment are aligned and separated by a spatial separation, and the bent wireform mid-linkage is pivotally coupled with the draw hook hinge end of the draw hook and is pivotally coupled with the panel base hinge;

wherein the bent wireform mid-linkage is configured to operate in at least four states comprising:
- a fully open state, wherein the bent wireform mid-linkage is fully decompressed;
- a partially open state, wherein the bent wireform mid-linkage is partially compressed, but where the draw hook hinge end of the draw hook is not adjacent to the first housing portion;
- an over-center state, wherein the bent wireform mid-linkage is compressed more than in the partially open state; and
- a closed state, wherein the bent wireform mid-linkage is compressed less than in the over-center state, and where the draw hook hinge end of the draw hook is adjacent to the first housing portion; and wherein the bent wireform mid-linkage is configured to fit into a mid-linkage cavity within the draw hook when the draw hook is in the closed state, and wherein the draw hook, when configured in the closed state, substantially encloses the bent wireform mid-linkage between the draw hook and the first housing portion.

10. The draw latch of claim 9, wherein the wire of the bent wireform mid-linkage is substantially c-shaped.

11. The draw latch of claim 9, wherein the wire of the bent wireform mid-linkage is substantially o-shaped.

* * * * *